Sept. 16, 1958 R. M. ASHBY 2,852,669

SCANNING RECEIVER WHICH IGNORES IMAGE SIGNAL AND LOCKS ON DESIRED SIGNAL

Filed Nov. 30, 1954 3 Sheets-Sheet 1

INVENTOR
ROBERT M. ASHBY

BY W.R. Maltby
ATTORNEYS

INVENTOR
ROBERT M. ASHBY
BY W. R. Maltby
ATTORNEYS

Sept. 16, 1958 R. M. ASHBY 2,852,669

SCANNING RECEIVER WHICH IGNORES IMAGE SIGNAL AND LOCKS ON DESIRED SIGNAL

Filed Nov. 30, 1954 3 Sheets-Sheet 3

INVENTOR
ROBERT M. ASHBY

BY W. R. Maltby
ATTORNEYS 2,852,669
Patented Sept. 16, 1958

2,852,669

SCANNING RECEIVER WHICH IGNORES IMAGE SIGNAL AND LOCKS ON DESIRED SIGNAL

Robert M. Ashby, Pasadena, Calif.

Application November 30, 1954, Serial No. 472,268

6 Claims. (Cl. 250—20)

(Granted under Title 35, U. S. Code (1952), sec. 266)

This invention relates to high frequency electrical apparatus and more particularly to automatic frequency control circuits for such apparatus.

In a microwave receiving system the received signals are converted to an intermediate frequency much lower than the transmitter frequency in order to obtain useful amplification. The conversion is accomplished by heterodyning the received signals with the output of a local oscillator to provide a signal at the difference frequency.

In case the receiving system makes use of a local oscillator having a reflex cavity electron tube such as the Shepard-Pierce or McNally type, the frequency of the local oscillator is controllable in two ways, by mechanical adjustment of the cavity volume and by adjustment of the amplitude of the repeller electrode bias voltage. The mechanical adjustment usually is used to set the oscillator frequency at approximately the correct value and the repeller voltage is adjusted to the exact value of the desired frequency. Most microwave systems have an intermediate frequency in the range of 30 to 60 megacycles or of the order of one percent of the microwave transmitter frequency. If the bandwidth of the intermediate frequency amplifier is approximately one tenth of one percent, a drift of one tenth of one percent in local oscillator or transmitter frequency results in considerable and serious loss of signal strength.

The primary object of the present invention is to provide a circuit arrangement to control the frequency of the local oscillator to maintain a constant difference frequency.

In heterodyne radar receivers employing automatic frequency control of the local oscillator, the local oscillator frequency may be controlled either above or below the transmitter frequency by the intermediate frequency. In general, if the automatic frequency control circuit is adjusted to provide proper control of the local oscillator at the higher of these frequencies, its operation at the lower value will be unsatisfactory, and vice versa. The prior art methods to prevent malfunction include restriction of the tuning range of the system relative to the intermediate frequency to eliminate the possibility of tuning the same signal above and below the transmitter frequency.

It is an object of the present invention to provide for proper operation of the automatic frequency control circuit without restrictions on the tuning range of the receiver.

It is a further object of the present invention to provide for proper operation of the automatic frequency control circuit without restrictions on the frequency or bandwidth of the intermediate frequency amplifier.

To accomplish the foregoing general objects and other more specific objects which will hereinafter appear, the present invention resides in the circuit elements and their relation one to another as described in the following specification.

The specification is accompanied by drawings in which.

Figure 1:
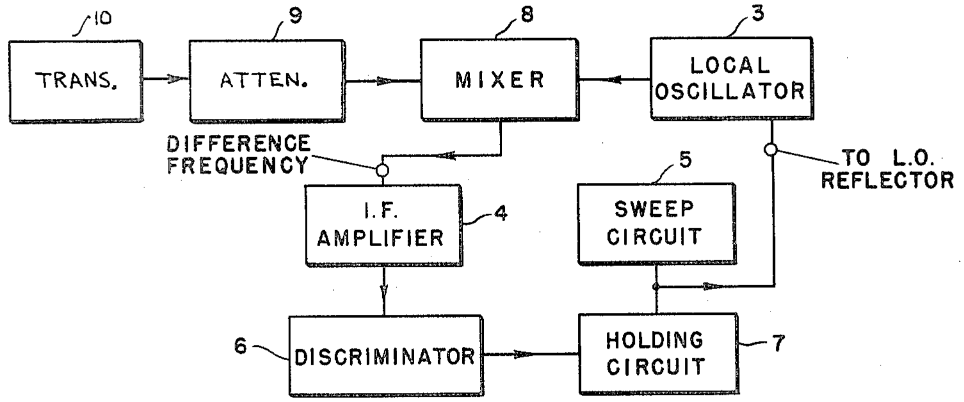
Fig. 1 is a block diagram of a conventional automatic frequency control circuit.

Referring to Fig. 1, the block diagram shows a conventional automatic frequency control circuit for a local oscillator of the reflex cavity electron tube type in which the oscillator frequency is controlled by adjusting the repeller voltage which is made negative with respect to the anode and grids. A more negative repeller voltage results in a higher frequency, a less negative repeller voltage results in a lower frequency. With no output signal from mixer 8, the repeller voltage of local oscillator 3 is swept repeatedly through its voltage range by the output of sweep circuit 5.

With the transmitter 10 turned on and a portion of its output coupled via attenuator 9 to mixer 8, the latter's output contains the difference frequency which is fed into an amplifier 4 tuned to the intermediate frequency. As the local oscillator repeller voltage is varied by the sweep circuit 5, the difference frequency varies, and when it is equal to the intermediate frequency, amplifier 4 produces an output signal which is fed to discriminator 6.

Figure 3:
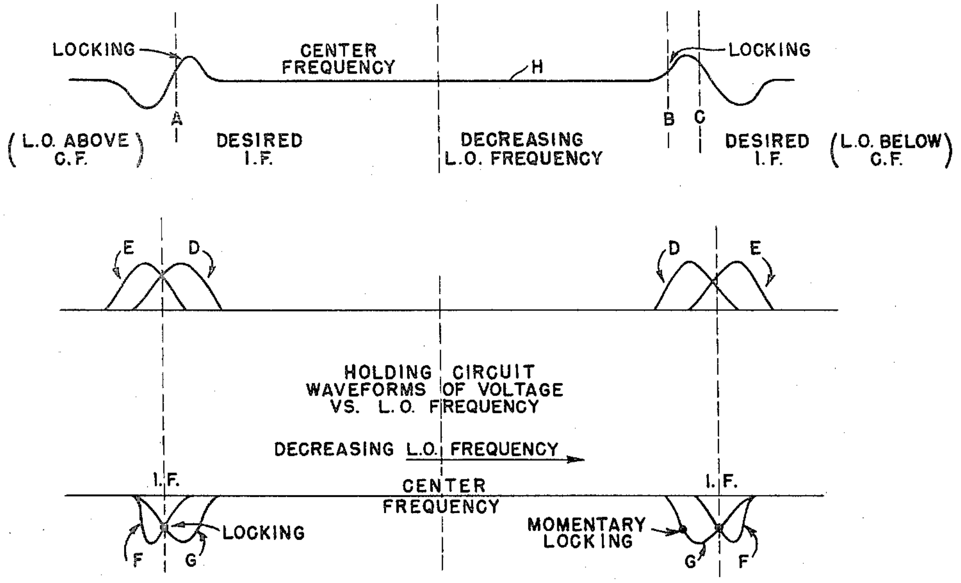
Fig. 3 is a graph of the voltages applied to the discriminator holding circuits of Figs. 1 and 2 corresponding to changes in local oscillator frequency.

Fig. 3 illustrates as curve H the output of discriminator 6 as a function of local oscillator frequency. The local oscillator is swept from high to low frequency, so the frequency axis in Fig. 3 is decreasing from left to right. The output of discriminator 6 is fed to the holding circuit 7 which controls the local oscilaltor repeller voltage. As the local oscillator frequency reaches point A, which is above the transmitter frequency by the intermediate frequency, it is prevented from decreasing further by the locking signal output of holding circuit 7. The output of discriminator 6 when the local oscillator is below the center frequency is a mirror image of the output with the local oscillator above the center frequency. If for some reason the locking signal should be momentarily removed, the local oscillator frequency will continue to decrease until it reaches point B. Since the slope of the discriminator output signal at B is of the same sign as at A, the holding circuit will act to prevent the local oscillator frequency from decreasing further. Point C is at the frequency below the center frequency by the intermediate frequency, so locking of the local oscillator occurs at an incorrect frequency, point B, below the center frequency. Locking cannot occur at point C because the slope of the correcting signal from the discriminator 6 is of the wrong sign, and a change in frequency will produce a signal to increase the error rather than compensate for it.

The ambiguity in the conventional automatic frequency control circuit described above is not a problem when the electrical tuning range of the local oscillator is insufficient to include both local oscillator frequencies which produce the desired intermediate frequency. For a 30 megacycle intermediate frequency, the electrical tuning range of the local oscillator can be 50 megacycles or less without ambiguity. For a 6 megacycle intermediate frequency amplifier, however, the electrical tuning range must not exceed 10 megacycles to avoid ambiguity. Since microwave oscillators have electrical tuning ranges greater than 10 megacycles, steps must be taken to prevent locking on the wrong side of the center frequency.

The present invention makes use of "wrong side rejection" to avoid ambiguity. In general the sweep circuit 5, which operates when the local oscillator is not locked, is disabled when locking occurs. If this sweep circuit can be disabled only at the desired intermediate frequency, then it can be seen that locking will occur only on the correct side of the center frequency. To illustrate this point reference is made to curve H of Fig. 3, wherein as the local oscillator frequency is swept downward, the correcting signal is obtained and locking occurs at point A, at the same time, the sweep circuit is disabled to prevent the local oscillator frequency from being returned to the starting point. If a transient or other disturbance should cause the locking signal to be removed momentarily, the sweep circuit acts to shift the local oscillator frequency downward until it reaches the locking point below the center frequency, point B, Fig. 3. Here a locking signal will occur, but since it is not at the correct frequency, the sweep circuit 5 is not disabled and will act to return the local oscillator frequency to the starting point and the cycle of sweep operation is repeated. Locking cannot occur at the correct frequency below the center frequency, (point C of Fig. 3) because the slope of the locking signal is of the wrong sign. Although the sweep circuit is disabled when the local oscillator is tuned to that frequency, the local oscillator frequency will continue to decrease until the sweep circuit is no longer disabled due to the slope of the curve H at point C.

Figure 2:
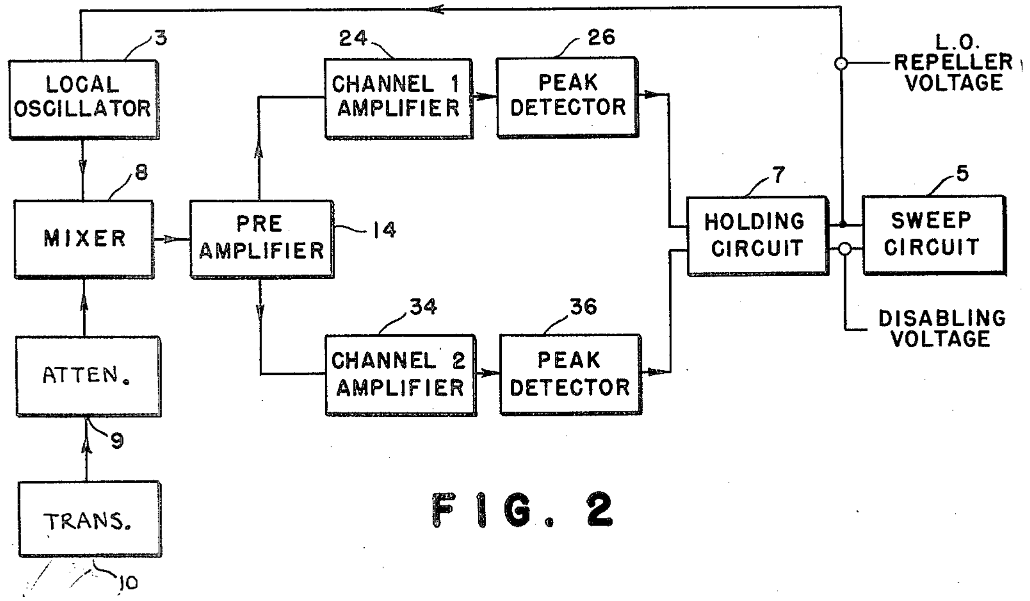
Fig. 2 is a block diagram of an automatic frequency control circuit embodying a preferred form of the invention.

Figure 2 is a block diagram of the circuit of the present invention with wrong sideband rejection. As in the conventional circuit, the output of local oscillator 3 and a part of the output of transmitter 10 are fed into mixer 8, and the difference frequency is fed into the preamplifier 14. The intermediate frequency amplifier now consists of a preamplifier 14 of one or more stages, depending on the magnitude of input signal, and two amplifier channels 24 and 34, each with its own detector 26 and 36, respectively. The preamplifier 14 is tuned to the desired intermediate frequency, while channel 1 or amplifier 24 is sharply tuned slightly below and channel 2 or amplifier 34 is sharply tuned slightly above the intermediate frequency. The detectors 26 and 36 are peak detectors, so that a constant direct voltage output is obtained for a constant frequency input regardless of whether the input is pulsed or continuous. The amplitude of each detector output voltage varies with frequency according to the frequency response characteristic of the respective amplifier channel.

The preamplifier 14 has a band-pass of about 2 megacycles, while the channels are sharply tuned, having a band-pass of about 0.3 megacycle. Channel 1 is centered at about 0.1 megacycle below the desired intermediate frequency, while channel 2 is centered about 0.1 megacycle above the intermediate frequency.

Idealized waveforms of the voltages applied to the input of holding circuit 7 as a function of local oscillator frequency are shown in Fig. 3. Waveform D is the output of channel 1. Waveform E is the output of channel 2. Waveform G is the controlling signal applied to the local oscillator, and waveform F is the disabling voltage applied to the sweep circuit 5.

Figure 4:
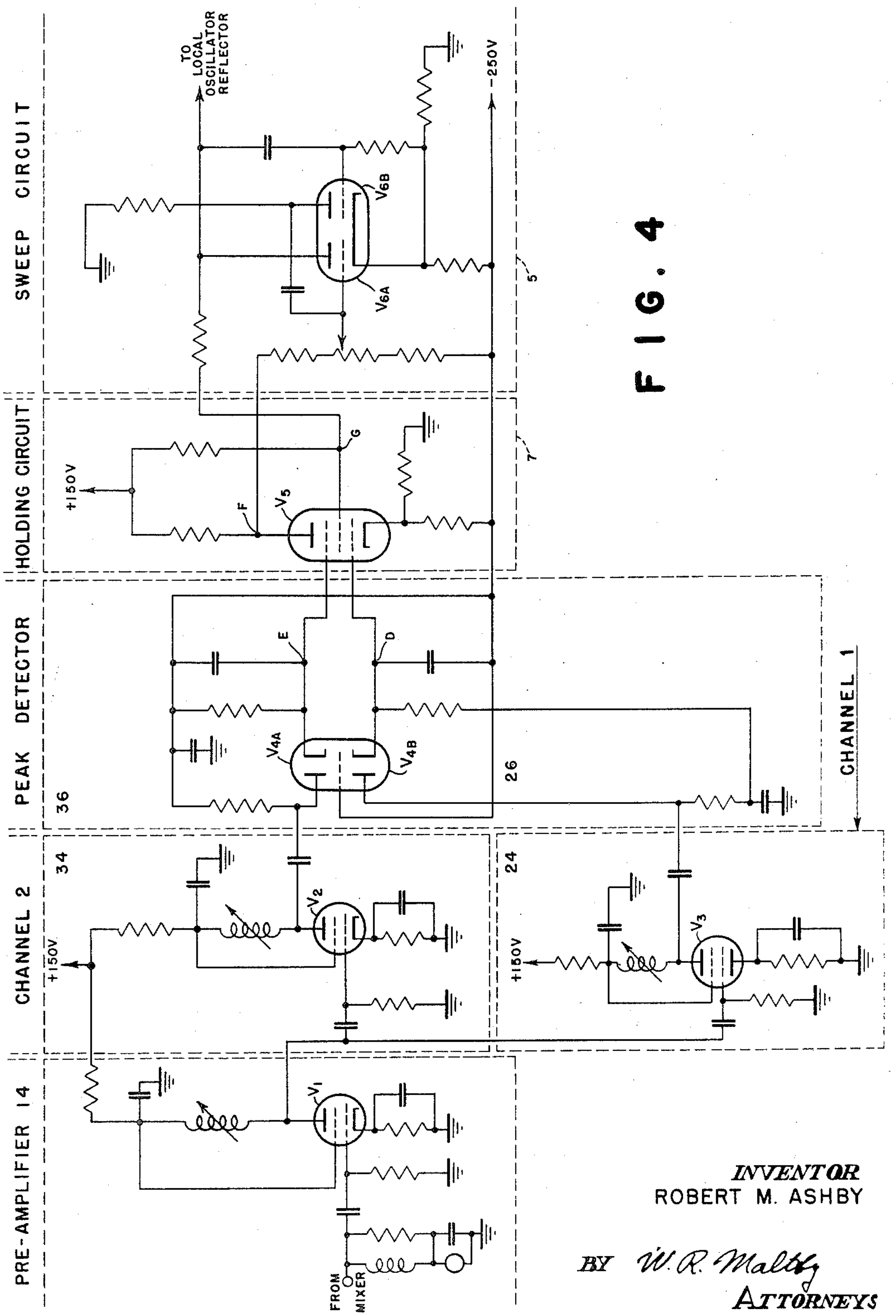
Fig. 4 is a detailed circuit diagram of the automatic frequency control system of Fig. 2.

Referring now to Fig. 4, it is seen that preamplifier 14 is a conventional amplifier of tuned grid-tuned plate type having a screen grid electron tube. The output of preamplifier 14 is divided and applied to the input of channels 1 and 2, each of which includes a tuned amplifier and a peak detector. With this arrangement each peak detector develops across its load impedance a voltage that varies with frequency as shown by curves D and E of Fig. 3. In holding circuit 7, pentode $V_5$ is biased to be nonconducting in the absence of waveform D, applied to the control grid of pentode $V_5$, and waveform E, applied to the suppressor grid of pentode $V_5$.

It should be noted that if no signal is applied from waveform D to the control grid neither the plate nor the screen of pentode $V_5$ can conduct. If both the control and suppressor grids receive voltages together, both plate and screen conduct. If the control grid receives a signal and the suppressor does not, only the screen grid conducts. This is illustrated in Fig. 3 curves E, D, F and G.

As the local oscillator frequency is swept downward the following takes place:

The local oscillator frequency approaches a point above the transmitter frequency by the intermediate frequency. The leading edge of waveform E is applied to the suppressor grid but it has no effect on the conductivity of pentode $V_5$ which is biased to be nonconducting. As waveform D is applied to the control grid with waveform E still on the suppressor grid, a voltage is reached which will allow the pentode to conduct, at which point both plate and screen voltages drop because of the voltage drop across the pentode load resistors. The screen voltage will drop to a value to hold the local oscillator repeller at the correct voltage to maintain the mixer output at the correct intermediate frequency. This action is automatic, since the screen voltage, and hence the repeller voltage, is controlled by a signal which is in turn dependent on the local oscillator frequency. Meanwhile, the decreased plate voltage of pentode $V_5$ is applied to swept circuit to disable sweep circuit 5.

If now, for some reason the signals are lost momentarily, sweep circuit 5 is again enabled, and will continue to sweep the local oscillator frequency downward approaching a point below the received signal frequency by the intermediate frequency. Here, however, waveform D Fig. 3 rises before waveform E. The screen grid of pentode $V_5$ conducts and tends to hold the local oscillator frequency at a value such as to maintain the signal as described above. Since the signals are a mirror image of the ones above the center frequency, the locking action does not now occur at exactly the desired intermediate frequency. This is because the leading edge of waveform D occurs at the same difference frequency as did the trailing edge of D with the local oscillator above the center frequency. Locking can occur only on a positive slope of waveform D, because a negative slope will increase an error in local oscillator frequency rather than compensate for it.

Although momentary locking does occur below the center frequency, the suppressor grid of pentode $V_5$ has had no signal applied from waveform E and the plate of pentode $V_5$ does not conduct. Thus no disabling signal is fed to sweep circuit 5, and its output voltage continues to sweep until eventually it terminates its cycle and returns to the starting point of the sweep. The local oscillator frequency is thereby restored to the starting point and a new cycle of sweep initiated to reach the desired point of control.

It will be understood that locking of the local oscillator at the lower side of the center frequency may be had by simply reversing the connections from the peak detectors to the pentode $V_5$ so that waveforms D and E appear at the suppressor and control grid, respectively, of this tube.

Figure 5:
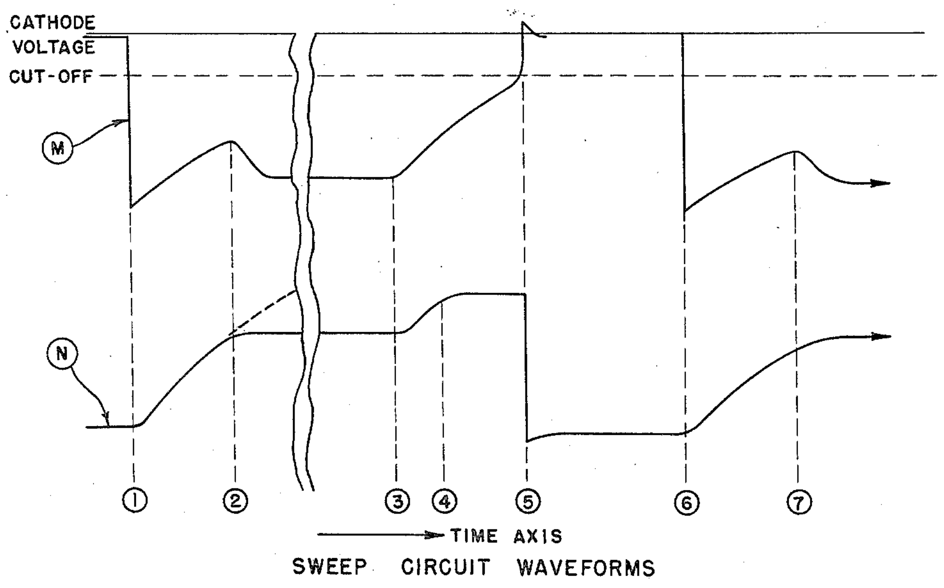
Fig. 5 is a graph of voltage waveforms in the sweep circuit of Fig. 4 and will be used to help explain its operation.

There are many conventional sweep circuits available, most of which are adaptable to operation according to the present invention. A satisfactory sweep circuit from all standpoints, which is illustrated in Fig. 4, is a conventional multivibrator with a natural period of about two seconds. The waveforms shown in Fig. 5 illustrate its operation under various conditions.

Waveform M is the control grid voltage of the $V_{6A}$ section of the double triode of the sweep circuit 5 of Fig. 4 while waveform N is the local oscillator reflector voltage. At time $t_1$, conduction in the double triode shifts from the $V_{6A}$ to the $V_{6B}$ section, dropping the grid voltage (M) and allowing the plate voltage to rise as (N). At time $t_2$, the local oscillator is oscillating at the correct frequency, and the holding signal keeps the plate voltage N at a constant value, while the disabling voltage M biases the grid of section $V_{6A}$ below cut off. The local oscillator is now locked at the correct frequency. At some later time $t_3$, a transient or other disturbance causes the locking signal to be removed momentarily. The plate voltage of $V_{6A}$ rises until the local oscillator frequency is below the received signal frequency and locking occurs again at time $t_4$. Now, however, there is no disabling voltage from M and the control grid $V_{6A}$ continues to rise until conduction shifts back to the $V_{6A}$ section of the double triode at time $t_5$. At time $t_6$, the cycle repeats to reach the proper frequency for control at time $t_7$.

The automatic frequency control circuit described above will give locking within ±0.1 megacycle of the desired intermediate frequency. For less stringent locking requirements than ±0.1 megacycle, the intermediate frequency amplifier channel bandwidths may be increased and their center frequencies proportionally further removed from the intermediate frequency. For intermediate frequencies about 10 megacycles, special coupling circuits may be required to obtain the narrow bandwidth of 0.3 megacycle, or locking tolerances may have to be increased. Another possibility is to increase the gain in the tuning loop. In most cases involving the higher intermediate frequencies, the wrong sideband is out of the electrical tuning range of the local oscillator, and the rejection feature is not needed.

When low intermediate frequencies are used with pulsed transmitter signals, the video output of the mixer 8, from rectification of the transmitter pulse, may contain a considerable voltage component at the intermediate frequency. This will produce an output at the detector and cause false locking. The use of a balanced mixer for the mixer 8 will eliminate this difficulty by canceling the video output.

While a preferred embodiment of the invention has been disclosed and described, it is understood that other modifications and changes may be made in the invention without departing from the spirit and scope thereof as set forth in the appended claims.

The invention described herein may be manufactured and used by or for the Government of the United States of America for governmental purposes without the payment of any royalty thereon or therefor.

What is claimed is:

1. Automatic control apparatus for maintaining substantially constant at a desired frequency the frequency difference between two high frequency sources comprising, a mixer responsive to signals from said sources to provide an output signal at the difference frequency, a scanner for cyclically varying the operating frequency of one of said sources over a predetermined frequency band, a two-channel discriminator responsive to said mixer output signal to produce first and second control signals, the first of said channels being tuned to a frequency slightly higher than said desired frequency and the second of said channels being tuned to a frequency lower than said desired frequency, each of said channels including a peak detector providing a unidirectional voltage output related to the departure of said mixer output frequency from the frequency to which the channel is tuned, a control circuit including an electron tube of the pentode type, the plate and screen grid of said pentode tube being coupled to a potential source through separate load impedances, means applying said first control signal to the control grid of said pentode tube and said second control signal to the suppressor grid of said pentode tube, said pentode tube being so biased to be normally nonconducting that both plate and screen grid conduct for time coincidence of said first and second control signals, only the screen grid conducts in the absence of said second control signal and the plate and screen grid remain nonconducting in the absence of said first control signal, means responsive to the screen grid potential of said pentode tube for varying the frequency of said one of said sources in a sense to maintain said mixer output signal frequency substantially at said desired frequency, and means responsive to the plate potential of said pentode tube for interrupting the cyclic variation of frequency of said one of said sources by said scanner.

2. Automatic control apparatus for maintaining substantially constant at a desired frequency the frequency difference between two high frequency sources comprising, a mixer responsive to signals from said sources to provide an output signal at the difference frequency, a multivibrator for generating a cyclic voltage, means responsive to said multivibrator output voltage for varying the operating frequency of one of said sources to scan repeatedly a predetermined frequency band, a frequency discriminator having a first channel tuned to a frequency slightly higher than said desired frequency and a second channel tuned to a frequency slightly lower than said desired frequency, each of said channels having a peak detector providing a unidirectional output voltage related to the departure of an input signal from the frequency to which the channel is tuned, means applying the output of said mixer to said frequency discriminator to obtain first and second control signals varying respectively in amplitude with the departure of said mixer output signal frequency above and below said desired frequency, a control circuit including an electron tube of the pentode type, means applying said first control signal to the control grid of said pentode tube and said second control signal to the suppressor grid of said pentode tube, said pentode tube being so biased to be normally nonconducting that both plate and screen grid conduct for time coincidence of said first and second control signals, only the screen grid conducts in the absence of said second control signal and the plate and screen remain nonconducting in the absence of said first control signal, a first resistor coupling said screen grid to a source of potential, a second resistor coupling said plate to a source of potential, means for applying the screen grid potential of said pentode tube to said one of said sources to vary the frequency thereof in a sense to maintain said mixer output signal frequency substantially at said desired frequency despite variations of frequency of the second of said sources and means for applying the plate potential of said pentode tube to said multivibrator to interrupt the cyclic operation thereof.

3. Automatic frequency control apparatus for maintaining substantially constant the desired frequency difference between the local oscillator and the received signal in a heterodyne receiver of a radio frequency communication system comprising, a mixer responsive to said received signal and said local oscillator output to produce a difference frequency control signal, a scanner for cyclically varying the operating frequency of said local oscillator over a predetermined frequency band, a two-channel frequency discriminator responsive to said mixer output signal to produce first and second control signals, the first of said channels being tuned to a frequency slightly higher than said desired frequency and the second of said channels being tuned to a frequency slightly lower than said desired frequency, each of said channels including a peak detector providing a unidirectional voltage output related to the departure of said mixer output signal frequency from the frequency to which the channel is tuned, a control circuit including an electron tube of the pentode type, said pentode tube having its plate and screen grid coupled to a source of potential through separate load impedances, means applying said first control signal to the control grid of said pentode tube and the second control signal to the suppressor grid of said pentode tube, said pentode tube being so biased to be normally nonconducting that both plate and screen conduct for time coincidence of said first and second control signals, only the screen grid conducts in the absence of said second control signal and the plate and screen remain nonconducting in the absence of said first control signal, means responsive to the screen grid potential of said pentode tube for varying the frequency of said local oscillator in a sense to maintain said mixer output signal frequency substantially at said desired frequency, and means responsive to the plate potential of said pentode tube for interrupting the cyclic variation of said local oscillator operating frequency.

4. Automatic frequency control apparatus for maintaining substantially constant a desired frequency difference between the local oscillator and the received signal in a heterodyne receiver of a radio frequency communication system comprising, a mixer responsive to said received signal and said local oscillator output to produce a difference frequency output signal, a multivabrator for generating a cyclic voltage, means responsive to said multivibrator output voltage for varying the operating frequency of said local oscillator to scan repeatedly a predetermined frequency band, a frequency discriminator having a first channel tuned to a frequency slightly higher than said desired frequency and a second channel tuned to a frequency slightly lower than said desired frequency, each of said channels having a peak detector providing a unidirectional output voltage related to the departure of an input signal from the frequency to which the channel is tuned, means applying the output of said mixer to said frequency discriminator to obtain first and second control signals varying respectively in amplitude with the departure of said mixer output signal frequency above and below said desired frequency, a control circuit including an electron tube of the pentode type having at least a plate, a cathode, a suppressor grid, a screen grid, and a control grid, said plate and said screen grid being coupled to a source of potential through separate load impedances, means applying said first control signal to said control grid and said second control signal to said suppressor grid, said pentode tube being so biased as to be normally nonconducting that both plate and screen grid conduct for time coincidence of said first and second control signals, only the screen grid conducts in the absence of said second control signal and the plate and screen remain nonconducting in the absence of said first control signal, means for applying the screen grid potential to said local oscillator to vary the frequency thereof in a sense to maintain said mixer output signal frequency substantially at said desired frequency despite variations of frequency of said received signal, and means for applying the plate potential of said pentode tube to said multivibrator to interrupt the cyclic operation thereof.

5. In a high frequency communication system having a receiver of high frequency electromagnetic wave energy signals including a local oscillator and a mixer for combining the outputs of the receiver and the local oscillator to obtain output signals at a difference frequency, frequency control apparatus for maintaining said frequency difference substantially constant at a desired value comprising, a generator for developing a cyclic voltage, means responsive to said generator output voltage for varying the operating frequency of said local oscillator to scan repeatedly a predetermined frequency band, a two-channel frequency discriminator responsive to said mixer output signal to produce first and second control signals, the first of said channels being tuned to a frequency slightly higher than said desired frequency, the second of said channels being tuned to a frequency slightly lower than said desired frequency, each of said channels including a peak detector providing a unidirectional voltage output related to the departure of said mixer output signal frequency from the frequency to which the channel is tuned, a control circuit including an electron tube of the pentode type, means applying said first control signal to the control grid of said pentode tube and said second control signal to the suppressor grid of said pentode tube, said pentode tube being so biased to be normally nonconducting that both plate and screen grid conduct for time coincidence of said first and second control signals, only the screen grid conducts in the absence of said second control signal and the plate and screen remain nonconducting in the absence of said first control signal, said plate and said screen grid being coupled to a source of potential through separate load impedances, means responsive to the screen grid potential of said pentode tube for varying the frequency of said local oscillator in a sense to maintain said mixer output signal frequency substantially at said desired frequency despite variation in frequency of said received signal, and means responsive to the plate potential of said pentode tube for interrupting the cyclic variation of said local oscillator operating frequency from said generator output voltage, whereby said control apparatus is effective to control said local oscillator frequency only while said local oscillator frequency is higher than said received signal frequency.

6. In a high frequency communication system having a receiver of high frequency electromagnetic wave energy signals including a local oscillator and a mixer for combining the outputs of the receiver and the local oscillator to obtain output signals at a difference frequency, frequency control apparatus for maintaining said frequency difference substantially constant at a desired value comprising, a generator for developing a cyclic voltage, means responsive to said generator output voltage for varying the operating frequency of said local oscillator to scan repeatedly a predetermined frequency band, a frequency discriminator having a first channel tuned to a frequency slightly higher than said desired frequency and a second channel tuned to a frequency slightly lower than said desired frequency, each of said channels having a peak detector providing a unidirectional output voltage related to the departure of an input signal from the frequency to which the channels are tuned, means applying the output of said mixer to said frequency discriminator to obtain first and second control signals varying respectively in amplitude with the departure of said mixer output signal frequency above and below said desired frequency, a control circuit including an electron tube of the pentode type having at least a plate, a cathode, a suppressor grid, a screen grid, and a control grid, impedance load means separately coupling said plate and said screen grid to a potential source, means applying said first control signal to said control grid and said second control signal to said suppressor grid, said pentode tube being so biased to be normally nonconducting that both plate and screen grid conduct for time coincidence of said first and second control signals, only the screen grid conducts in the absence of said second control signal and the plate and screen remain nonconducting in the absence of said first control signal, means for applying the screen grid potential of said pentode tube to said local oscillator to vary the frequency thereof in a sense to maintain said mixer output signal frequency substantially at said desired frequency despite variations of frequency of said received signal, and means for applying the plate potential of said pentode tube to said generator to interrupt the cyclic operation thereof, whereby said control apparatus is effective to control the local oscillator operating frequency only when said local oscillator frequency is higher than the frequency of the received signal.

References Cited in the file of this patent

UNITED STATES PATENTS

| | | |
|---|---|---|
| 2,263,633 | Koch | Nov. 25, 1941 |
| 2,434,294 | Ginzton | Jan. 13, 1948 |
| 2,478,977 | Nicholson, Jr. | Aug. 16, 1949 |
| 2,686,877 | Lawson | Aug. 17, 1954 |

FOREIGN PATENTS

| | | |
|---|---|---|
| 641,900 | Great Britain | Aug. 23, 1950 |